US012689703B2

(12) United States Patent
Hirota

(10) Patent No.: US 12,689,703 B2
(45) Date of Patent: Jul. 21, 2026

(54) IMAGE FORMING APPARATUS FOR FORMING-ADJUSTMENT IMAGE ON SHEET

(71) Applicant: CANON KABUSHIKI KAISHA, Tokyo (JP)

(72) Inventor: Kenichi Hirota, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 18/596,793

(22) Filed: Mar. 6, 2024

(65) Prior Publication Data

US 2024/0314258 A1 Sep. 19, 2024

(30) Foreign Application Priority Data

Mar. 13, 2023 (JP) ................................. 2023-038351

(51) Int. Cl.
*H04N 1/00* (2006.01)
*H04N 1/60* (2006.01)

(52) U.S. Cl.
CPC ....... *H04N 1/6044* (2013.01); *H04N 1/00045* (2013.01); *H04N 1/0057* (2013.01)

(58) Field of Classification Search
CPC .......... H04N 1/00034; H04N 1/00045; H04N 1/0057; H04N 1/6044; G06K 15/027

USPC ................................................. 358/1.15, 504
See application file for complete search history.

(56) References Cited

U.S. PATENT DOCUMENTS

| | | | |
|---|---|---|---|
| 9,551,966 B2 | 1/2017 | Hirota et al. | |
| 9,971,270 B2 | 5/2018 | Hirota et al. | |
| 2020/0242428 A1* | 7/2020 | Omata ................. | G06K 15/021 |
| 2023/0044272 A1* | 2/2023 | Nakashio .............. | G06F 3/1208 |

* cited by examiner

*Primary Examiner* — Kent Yip
(74) *Attorney, Agent, or Firm* — ROSSI, KIMMS & McDOWELL LLP

(57) ABSTRACT

An image forming apparatus includes an image forming unit configured to form an image on a sheet based on an image forming condition, a conveyance unit configured to convey a sheet having a pattern image formed thereon by the image forming unit to a conveyance path, the pattern image including a plurality of patch images and a trigger image used for controlling a reading timing for each of the plurality of patch images, a reading unit configured to read the pattern image on the sheet while the sheet having the pattern image formed thereon is conveyed by the conveyance unit, and a controller configured to, in a case of forming the pattern image on a first sheet having a first basis weight, control the image forming unit so as to form a first pattern image on the first sheet.

15 Claims, 10 Drawing Sheets

IMAGE FORMING APPARATUS FOR FORMING-ADJUSTMENT IMAGE ON SHEET

BACKGROUND OF THE INVENTION

Field of the Invention

The present disclosure relates to an image forming apparatus such as a copying machine, a multifunction peripheral, or a printer, which includes a reading device that reads an image formed on a sheet.

Description of the Related Art

In commercial printing, color management is considered important. Thus, an image forming apparatus used for commercial printing is desired not only to stabilize the color reproducibility of a product to be output but also to have a variety in color measurement, for example, color authentication of an image forming apparatus. The color authentication of an image forming apparatus is required to be performed through color measurement by reading a predetermined number of patch images as designated by authentication organizations of respective countries (for example, FOGRA and Japan Color). The predetermined number is, for example, 1,000 or more. A sheet having patch images printed thereon is hereinafter referred to as "chart sheet."

It has been desired that color measurement for patch images be performed inline for power saving. That is, it is preferred that a sensor that performs color measurement for patch images be provided inside an image forming apparatus. For highly accurate color measurement, it is required that mixed colors be detected in a spectral reflectance waveform. Thus, an image forming apparatus that performs color measurement inline by using a spectral color sensor has been proposed (U.S. Pat. Nos. 9,551,966 and 9,971, 270). This image forming apparatus includes a spectral color sensor that detects mixed colors in a spectral reflectance waveform for highly accurate color measurement. This image forming apparatus is capable of performing inline color measurement by using the spectral color sensor provided therein.

The inline color measurement is performed also to improve added values of a product. Examples of the added values include stability information regarding a color tone given during printing for indicating a state given during printing of a product that is to be delivered in commercial printing. The stability information regarding a color tone given during printing is obtained, for example, from a color measurement result of inline color measurement. The color tone is determined not only by a color material, and may also be affected by sheet characteristics, such as formation and whiteness of a sheet. Thus, it is required that the inline color measurement be performed not only on a standard sheet but also on various types of sheets.

The inline color measurement is performed immediately before execution of a print job or during printing, and it is desired that the time required for color measurement be reduced as much as possible so as not to hinder the productivity of printing. Further, it is desired that, from the viewpoint of reducing waste sheets, a large number of patch images be printed on one chart sheet subjected to the inline color measurement. Thus, it is required that the size of patch images to be printed on a sheet be minimized. The size of the patch images is determined based on the responsiveness of a sensor to be used for color measurement or the exposure time of a sensor required for performing stable color measurement from a chart sheet being conveyed. The size of the patch images is determined in such a manner, and hence the number of patch images to be printed on a sheet is limited.

At the time of conveying a thick sheet (in general, a sheet having a basis weight of 300 gsm or more) by rollers, minute slippage may occur even in a case where a substantially horizontal conveyance path with a small conveyance resistance against a sheet is provided. As a result, the thick sheet is reduced in conveyance speed, which may cause minute conveyance delay as compared to a plain sheet (in general, a sheet having a basis weight of less than 300 gsm).

In a case of performing color measurement for a plurality of patch images while conveying a sheet, successively performing the color measurement a predetermined number of times as triggered by detection of a trigger patch image serving as a trigger for the color measurement is efficient in terms of maximizing the number of patch images that can be arranged within one chart sheet. After the trigger patch image has been initially detected, the color measurement operation is successively repeated at predetermined timings. Thus, in a case of performing the color measurement for a chart sheet produced with a thick sheet, errors in color measurement positions accumulate due to reduction in conveyance speed for a sheet.

As the accumulated errors in color measurement positions increase, a patch image that is adjacent to a patch image that should originally be subjected to the color measurement may possibly be subjected to the color measurement. In this case, erroneous detection occurs. In order to prevent such erroneous detection, a margin is provided to the size of patch images by an amount corresponding to a speed error that is typically assumed. However, in a case where the size of patch images is set in consideration of the conveyance delay of a thick sheet with respect to a plain sheet being a standard sheet for an image forming apparatus, the number of patch images that can be arranged on one chart sheet is reduced, which may cause an increase in waste sheets. The size of patch images to be printed on a chart sheet of a thick sheet cannot be set larger than the size of patch images to be printed on a chart sheet of a plain sheet. As a result, stable inline color measurement for a thick sheet may be difficult.

SUMMARY OF THE INVENTION

An image forming apparatus according to one embodiment of the present disclosure includes an image forming unit configured to form an image on a sheet based on an image forming condition, a conveyance unit configured to convey a sheet having a pattern image formed thereon by the image forming unit to a conveyance path, the pattern image including a plurality of patch images and a trigger image used for controlling a reading timing for each of the plurality of patch images, a reading unit configured to read the pattern image on the sheet while the sheet having the pattern image formed thereon is conveyed by the conveyance unit, and a controller configured to, in a case of forming the pattern image on a first sheet having a first basis weight, control the image forming unit to form a first pattern image on the first sheet, and generate the image forming condition based on a result of reading the first pattern image by the reading unit, in a case of forming the pattern image on a second sheet having the same size as a size of the first sheet and having a second basis weight larger than the first basis weight, control the image forming unit so as to form a second pattern image on the second sheet, and generate the image forming condition based on a result of reading the second pattern image by the reading unit, the number of trigger images included in the second pattern image being larger than the number of trigger images included in the first pattern image, a position of one trigger image on the second sheet being different from a position of another trigger image on the second sheet in a conveyance direction in which the sheet is conveyed.

Further features of the present invention will become apparent from the following description of exemplary embodiments (with reference to the attached drawings).

DESCRIPTION OF THE EMBODIMENTS

Now, at least one embodiment of the present disclosure is described with reference to the drawings.

<Image Forming Apparatus>

Figure 1:
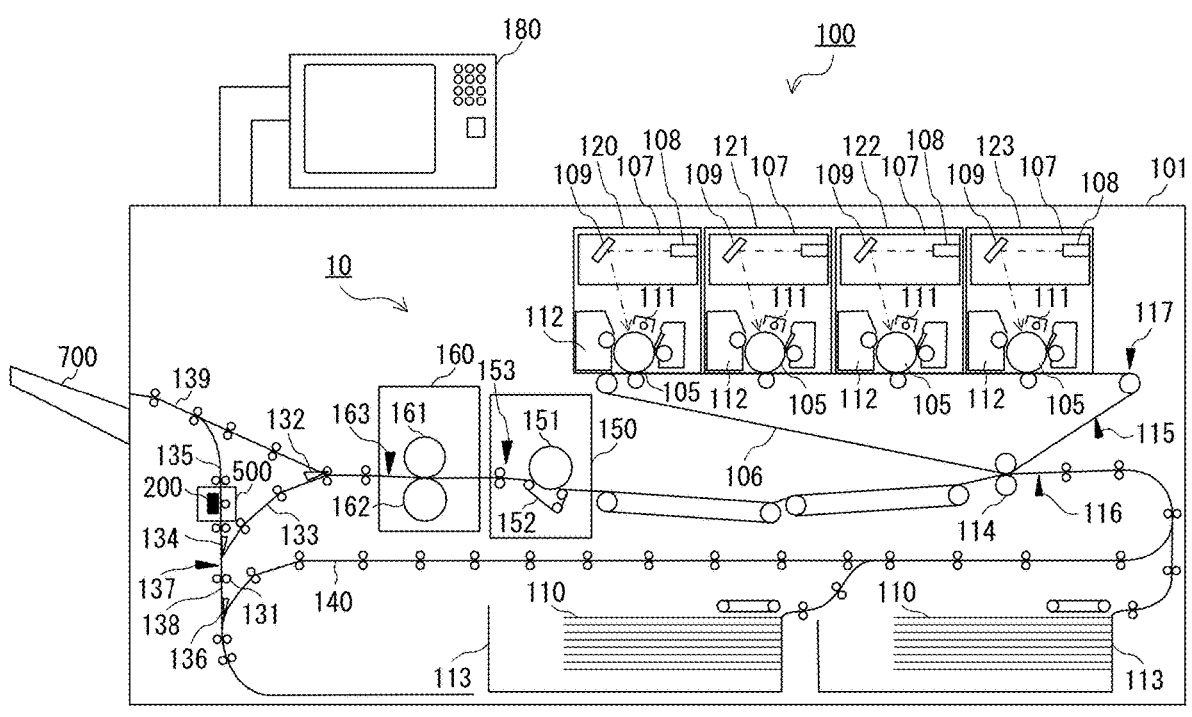
FIG. 1 is a configuration view of an image forming apparatus.

FIG. 1 is a configuration view of an image forming apparatus according to the at least one embodiment. An image forming apparatus 100 according to the at least one embodiment is a printer that prints an image on a sheet 110 by an electrophotographic method. The image forming apparatus 100 according to the at least one embodiment may be an ink jet printer or a sublimation printer.

The image forming apparatus 100 includes, in a housing 101 thereof, mechanisms that form a printer engine 10 for image formation, and a controller, which is described later, that controls operations of the mechanisms. An operation panel 180 is provided on top of the housing 101. The operation panel 180 is a user interface, and includes an input interface and an output interface. The input interface receives an instruction from a user. The output interface displays a screen, for example, an operation screen. Examples of the input interface include various key buttons and a touch panel. Examples of the output interface include a display and a speaker. The mechanisms forming the printer engine 10 include a mechanism for forming an image (image forming mechanism), a mechanism for transferring an image onto the sheet 110 (transfer mechanism), a mechanism for feeding the sheet 110 (feeding mechanism), and a mechanism for fixing the image to the sheet 110 (fixing mechanism).

The image forming mechanism includes four image forming units 120, 121, 122, and 123 corresponding to respective colors of yellow (Y), magenta (M), cyan (C), and black (K). The image forming units 120, 121, 122, and 123 form images of corresponding colors. The image forming units 120, 121, 122, and 123 are different from each other only in colors of images to be formed, and have the same configuration. Here, a configuration of the image forming unit 120 is described, and description of configurations of the other image forming units 121, 122, and 123 is omitted.

The image forming unit 120 includes a photosensitive drum 105, a charging device 111, a laser scanner 107, and a developing device 112. The photosensitive drum 105 is a drum-shaped photosensitive member having a photosensitive layer on a surface thereof, and rotates about a drum shaft. The charging device 111 uniformly charges the photosensitive layer on the surface of the rotating photosensitive drum 105. The laser scanner 107 scans the surface of the photosensitive drum 105 with a laser beam modulated based on image data representing an image to be formed. The laser scanner 107 includes a light emitter 108 and a reflection mirror 109. The light emitter 108 performs scanning in one direction with a laser beam emitted from a semiconductor laser. The reflection mirror 109 reflects the laser beam from the light emitter 108 toward the photosensitive drum 105. A direction in which the laser scanner 107 scans the photosensitive drum 105 (direction toward a far side in FIG. 1) is a main scanning direction.

In a case where the photosensitive drum 105 is scanned with the laser beam after being charged, an electrostatic latent image is formed on the surface in accordance with the image data. The developing device 112 uses a developer of a corresponding color to develop the electrostatic latent image formed on the photosensitive drum 105. Accordingly, an image obtained as a result of forming the electrostatic latent image into a visible image (developer image) is formed on the surface of the photosensitive drum 105. A yellow image (developer image) is formed on the photosensitive drum 105 of the image forming unit 120. A magenta image (developer image) is formed on the photosensitive drum 105 of the image forming unit 121. A cyan image (developer image) is formed on the photosensitive drum 105 of the image forming unit 122. A black image (developer image) is formed on the photosensitive drum 105 of the image forming unit 123. The photosensitive drum 105 and the developing device 112 are mountable to and removable from the housing 101.

The transfer mechanism includes an intermediate transfer member 106 and a transfer roller 114. The intermediate transfer member 106 receives images that are sequentially transferred thereonto in superimposition from the respective photosensitive drums 105 of the image forming units 120, 121, 122, and 123. In the at least one embodiment, the intermediate transfer member 106 rotates clockwise in FIG. 1, and the images are transferred from the image forming unit 120 (yellow), the image forming unit 121 (magenta), the image forming unit 122 (cyan), and the image forming unit 123 (black) in the stated order. On the downstream side of the image forming unit 123 in the rotation direction of the intermediate transfer member 106, an image density detection sensor 117 for detecting an image density from an image density detection image formed on the intermediate transfer member 106 is provided.

The images having been transferred onto the intermediate transfer member 106 are conveyed to the transfer roller 114 by the rotation of the intermediate transfer member 106. On the upstream side of the transfer roller 114 in the rotation direction of the intermediate transfer member 106, an image formation start position detection sensor 115 for determining a transfer position with respect to the sheet 110 is provided. The image formation start position detection sensor 115 detects the images on the intermediate transfer member 106. The transfer roller 114 brings the sheet 110 into pressure contact with the intermediate transfer member 106 and, at the same time, is applied with bias having a polarity opposite to those of the images, thereby transferring the images from the intermediate transfer member 106 onto the sheet 110.

The feeding mechanism includes sheet-feeding cassettes 113, conveyance paths, and various rollers. The sheet-feeding cassettes 113 accommodate sheets 110. The conveyance paths allow the sheet 110 to be fed therealong. The various rollers convey the sheet 110 to the conveyance paths. The sheet 110 is fed from the sheet-feeding cassette 113, and the images are transferred onto and fixed to the sheet 110 while the sheet 110 is conveyed along the conveyance path. As a result, an image is formed on the sheet 110. The sheet 110 is then delivered to a delivery tray 700 provided outside the housing 101.

To that end, the sheet 110 is first fed from the sheet-feeding cassette 113 to the transfer roller 114 along the conveyance path. In the midway of the conveyance path from the sheet-feeding cassette 113 to the transfer roller 114, a sheet-feeding timing sensor 116 for adjusting a conveyance timing for the sheet 110 is provided. The timing at which the sheet 110 is conveyed to the transfer roller 114 is adjusted based on the timing at which the image formation start position detection sensor 115 detects the images on the intermediate transfer member 106 and the timing at which the sheet-feeding timing sensor 116 detects the sheet 110. Accordingly, the images are transferred from the intermediate transfer member 106 onto a predetermined position on the sheet 110.

The sheet 110 having the images transferred thereonto is conveyed to the fixing mechanism. The fixing mechanism in the at least one embodiment includes a fixing device 150 and a cooling unit 160. In order to thermally fix the images to the sheet 110, the fixing device 150 includes a fixing roller 151 for heating the sheet 110, a pressure belt 152 for bringing the sheet 110 into pressure contact with the fixing roller 151, and a post-fixing sensor 153 that detects completion of fixing. The fixing roller 151 is a hollow roller having a heater provided therein, and is configured to convey the sheet 110 by rotation. The pressure belt 152 brings the sheet 110 into pressure contact with the fixing roller 151, and follows the rotation of the fixing roller 151. The post-fixing sensor 153 detects the sheet 110 to which the images have been fixed.

The cooling unit 160 is disposed on the downstream side of the fixing device 150 in the conveyance direction of the sheet 110, and is used for cooling the sheet 110 that has been heated at the time of the fixing processing performed by the fixing device 150. The cooling unit 160 cools the sheet 110 to reduce supply of heat from the sheet 110 to the transfer mechanism at the time of duplex printing, to thereby reduce the amount of curling of a product. The cooling unit 160 includes a roller 161, a roller 162, and a post-cooling sensor 163. The cooling unit 160 sandwiches and conveys the sheet 110 with a nip portion formed by the roller 161 and the roller 162, to thereby transfer heat of the sheet 110 to the rollers 161 and 162. The rollers 161 and 162 are configured so as to radiate the heat transferred from the sheet 110 by using a cooling fan (not shown). The post-cooling sensor 163 detects the sheet 110 after cooling.

The sheet 110 having been cooled by the cooling unit 160 may be delivered as it is, or may be conveyed to a conveyance path 133. To that end, a flapper 132 is provided after the cooling unit 160. The flapper 132 guides the sheet 110 to any one of the conveyance path 133 or a delivery path 139 for the sheet 110. The sheet 110 guided to the delivery path 139 is delivered to the delivery tray 700 as it is.

The conveyance path 133 is a path for conveying the sheet 110 to a reverse path 138 used for reversing the sheet 110 front and back. A reverse sensor 137 that detects the sheet 110 is provided on the reverse path 138. In a case where the reverse sensor 137 detects a trailing edge of the sheet 110, the conveyance direction of the sheet 110 is reversed by the reverse path 138. The sheet 110 that has been reversed in the conveyance direction is conveyed to any one of a post-conveyance path 135 or a reverse path 140. To that end, flappers 134 and 136 for branching the post-conveyance path 135 and the reverse path 140 are provided. In the case of being conveyed to the post-conveyance path 135, the sheet 110 is guided to the post-conveyance path 135 by the flappers 134 and 136, and is reversed front and back and delivered to the delivery tray 700 via the delivery path 139. In the case of being conveyed to the reverse path 140, the sheet 110 is reversed front and back, and is conveyed to the transfer roller 114 again. Accordingly, image formation on the back surface of the sheet 110 can be performed.

<Color Measurement Unit>

Figure 2:
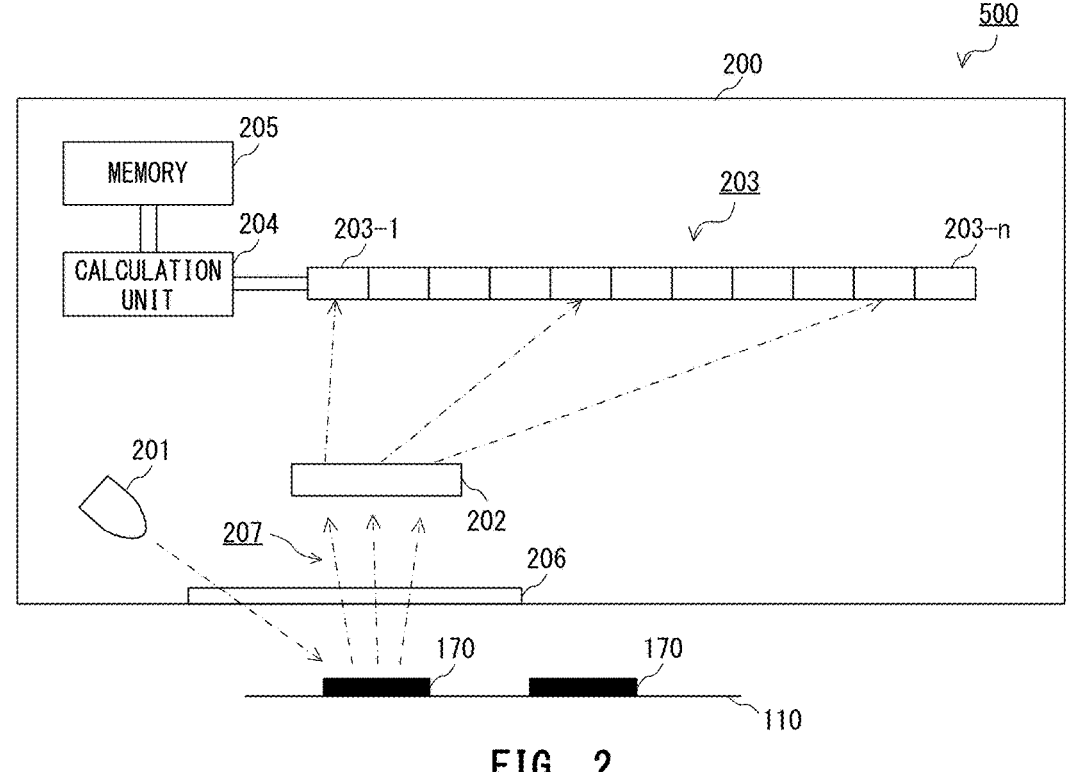
FIG. 2 is an explanatory configuration view of a color measurement unit.

The image forming apparatus 100 includes a color measurement unit 500. The color measurement unit 500 includes a color sensor 200 for measuring a spectral reflectance of an image printed on the sheet 110. The color measurement unit 500 is a reading device that reads patch images (pattern image) being image-adjustment images printed on the sheet 110, and is provided on the post-conveyance path 135. Based on a result of reading the image-adjustment images by the color measurement unit 500, image adjustment for an image to be printed next is performed. Through the image adjustment, image quality, for example, a color tone is kept constant. The color measurement unit 500 may be provided on a conveyance path other than the post-conveyance path 135 as long as the color measurement unit 500 is located at a position where the color measurement can be performed after the fixing processing and before delivery. For example, the color measurement unit 500 may be provided on the delivery path 139. FIG. 2 is an explanatory configuration view of the color measurement unit 500.

The color sensor 200 is a spectral color sensor for performing color measurement by detecting a spectral reflectance of each of patch images 170 formed on the sheet 110. The patch images 170 are each an image for maintaining the quality of an image to be printed. The color sensor 200 includes a white light emitting diode (LED) 201, a diffraction grating 202, a line sensor 203, a calculation unit 204, a memory 205, and a lens 206. The color sensor 200 reads an image formed on the sheet 110 being conveyed.

The white LED 201 is a light emitter, and radiates white light to the sheet 110 being conveyed along the post-conveyance path 135. The lens 206 condenses the white light radiated from the white LED 201 onto the patch image 170, and diffuses reflected light 207 from the patch image 170 toward the diffraction grating 202. The diffraction grating 202 disperses the reflected light 207 from the patch image 170 by wavelengths. The line sensor 203 receives the reflected light 207 dispersed by the diffraction grating 202.

The line sensor 203 is a light receiver including "n" ("n" pixels) light receiving elements 203-1 to 203-n. The light receiving elements 203-1 to 203-n of the line sensor 203 receive the reflected light dispersed by wavelengths by the diffraction grating 202. The light receiving elements 203-1 to 203-n receive the reflected light having wavelengths respectively allocated thereto. The light receiving elements 203-1 to 203-n are, for example, complementary metal oxide semiconductor (CMOS) sensors.

The light-reception results (detection results) obtained by the light receiving elements 203-1 to 203-n relate to spectral wavelengths. It is preferred that, in order to obtain a detection result with a resolution of 10 nm within the range of from 380 nm to 780 nm, the number of the light receiving elements 203-1 to 203-n be equal to or more than 41 (n=41). In order to arrange a relationship between wavelengths and numbers of the light receiving elements, it is appropriate to provide 48 or 64 light receiving elements based on, for example, an adjustment range. Further, the number of light receiving elements may be reduced to interpolate insufficient detection results of wavelengths.

Each of the light receiving elements 203-1 to 203-n outputs, as a detection result, for example, a light intensity value representing the intensity of the received reflected light as spectral data. The calculation unit 204 performs a predetermined calculation on a light intensity value of each wavelength output from each of the light receiving elements 203-1 to 203-n. For example, the calculation unit 204 performs a spectral calculation on the light intensity values or calculates Lab values. The calculation unit 204 has an A/D conversion function, and converts the detection results of the light receiving elements 203-1 to 203-n into digital signals to perform various calculations. The memory 205 stores color measurement results, for example, calculation results.

<Controller>

Figure 3:
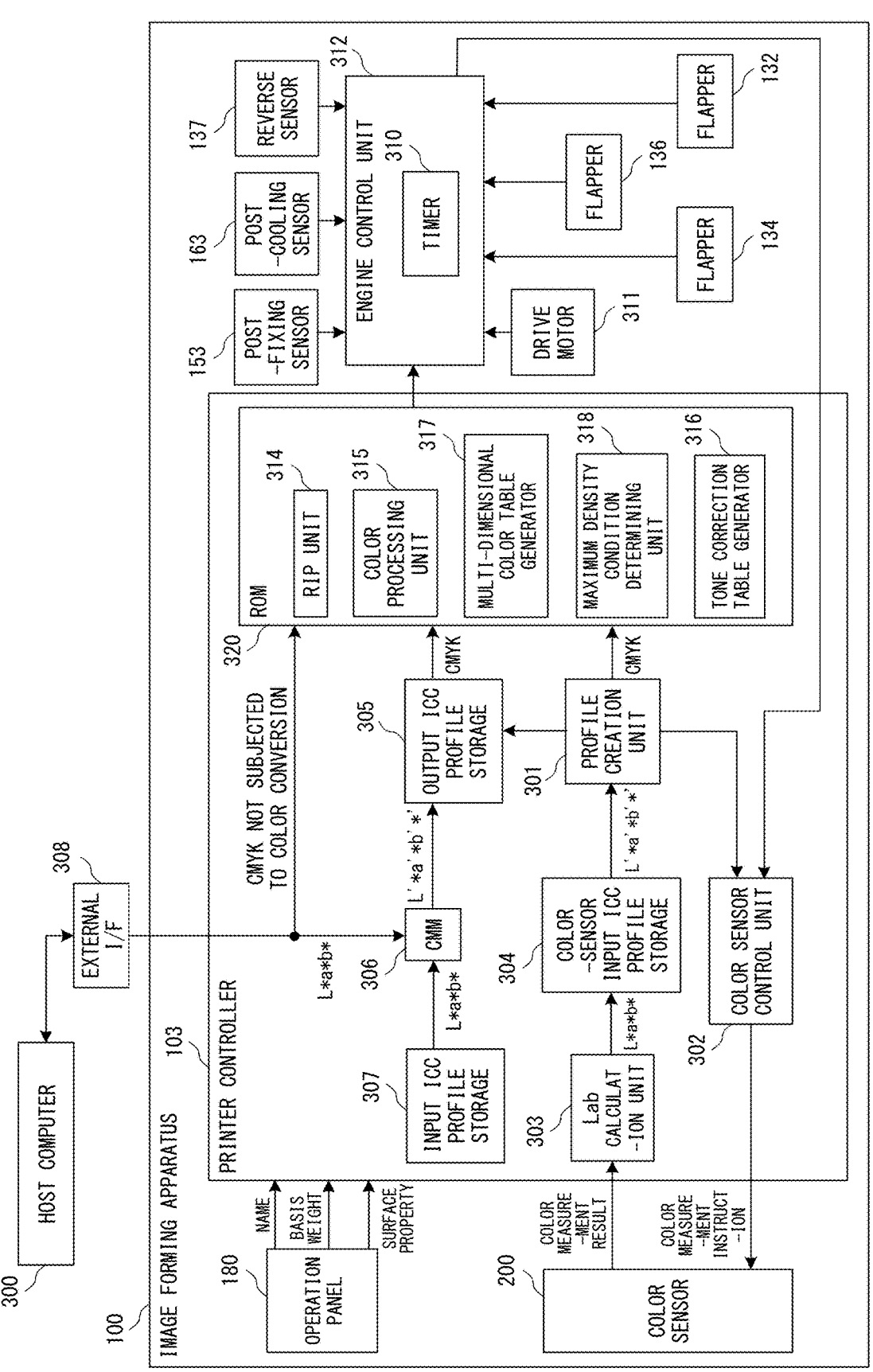
FIG. 3 is an explanatory diagram of a controller.

FIG. 3 is an explanatory diagram of a controller that controls operations of the image forming apparatus 100 having the configuration as described above. The image forming apparatus 100 is provided with a printer controller 103 and an engine control unit 312 as a controller. The printer controller 103 controls an overall operation of the image forming apparatus 100. The engine control unit 312 controls an operation of the printer engine 10.

The post-fixing sensor 153, the post-cooling sensor 163, the reverse sensor 137, a drive motor 311 that drives various rollers for conveying the sheet 110, and the flappers 132, 134, and 136 are connected to the engine control unit 312. The engine control unit 312 controls the drive motor 311 included in the feeding mechanism and the flappers 132, 134, and 136 based on the detection results of the sensors to perform conveyance of the sheet 110 by the printer engine 10. Further, although not shown, the engine control unit 312 controls operations of the image forming mechanism, the transfer mechanism, and the fixing mechanism to perform image formation on the sheet 110. The operation of the engine control unit 312 is controlled by the printer controller 103.

The color sensor 200, the operation panel 180, and an external I/F 308 are connected to the printer controller 103. The external I/F 308 is a communication interface for communication to and from a host computer 300 that is an external device via a predetermined network. The printer controller 103 is capable of receiving, for example, a print job from the host computer 300 via the external I/F 308.

The printer controller 103 controls the operation of the image forming apparatus 100 to print an image on the sheet 110. The printer controller 103 is formed of a combination of a semiconductor device and various electronic components. The semiconductor device is, for example, a central processing unit (CPU), an application-specific integrated circuit (ASIC), or a micro processing unit (MPU). Further, the printer controller 103 may be formed of a system-on-a-chip (SOC).

The printer controller 103 processes a print job acquired from the host computer 300 via the external I/F 308 with functional blocks stored in a ROM 320. The ROM 320 stores a raster image processor (RIP) unit 314, a color processing unit 315, a tone correction table generator 316, a multi-dimensional color table generator 317, and a maximum density condition determining unit 318. The RIP unit 314 expands various image objects generated from data included in the print job received from the host computer 300 into bitmap images. The maximum density condition determining unit 318, the tone correction table generator 316, and the multi-dimensional color table generator 317 that has reflected correction results of mixed colors manage and update ICC profile information, γLUT information, and Vcont information to be used at the time of image formation. The color processing unit 315 performs color conversion processing on the mixed colors of an image to be printed based on those pieces of information.

The printer controller 103 transmits image data generated from the print job through the processing by each of the functional blocks of the ROM 320 to the engine control unit 312. The engine control unit 312 prints an image on the sheet 110 based on the image data.

The printer controller 103 includes a profile creation unit 301, a color sensor control unit 302, a Lab calculation unit 303, and a color-sensor input ICC profile storage 304, in addition to the ROM 320. Further, the printer controller 103 includes an output ICC profile storage 305, a color management module (CMM) 306, and an input ICC profile storage 307.

The color sensor control unit 302 controls the operation of the color sensor 200 in accordance with an instruction from the engine control unit 312. The color sensor 200 performs color measurement processing in accordance with control by the color sensor control unit 302. The engine control unit 312 instructs the color sensor control unit 302 to control the color sensor 200 in accordance with, for example, a timing at which a chart sheet arrives at a color measurement position of the color sensor 200. The timing at which the chart sheet arrives at the color measurement position of the color sensor 200 is determined, for example, in accordance with a detection timing of the chart sheet by the reverse sensor 137.

In a case where a user would like to know a color tone of a final output item, for example, at the time of parts replacement by a customer engineer, before a job for which a color matching accuracy is required, and even in a designing stage, the user uses the operation panel 180 to give an instruction to perform processing for creating a profile. The printer controller 103 creates the profile in accordance with the instruction from the operation panel 180.

The instruction to create a profile is input to the profile creation unit 301 from the operation panel 180. The profile creation unit 301 transmits signals to the engine control unit 312 so as to form CMYK (cyan, magenta, yellow, black) color signals of an ISO 12642 test form (patch images) without a profile in accordance with the instruction. At the same time, the printer controller 103 transmits a color measurement instruction from the color sensor control unit 302 to the color sensor 200. The engine control unit 312 controls the operation of the image forming apparatus 100 to print the ISO 12642 test form (patch images) on the sheet 110.

The sheet 110 (chart sheet) having the test form (patch images) printed thereon is subjected to the color measurement by the color sensor 200. Spectral reflectance data that is a color measurement result of 928 patch images having been subjected to the color measurement is input to the printer controller 103. The spectral reflectance data is converted into L*a*b* data by the Lab calculation unit 303 and temporarily stored in the color-sensor input ICC profile storage 304, and is thereafter input to the profile creation unit 301. The spectral reflectance data may be converted into a CIE 1931 XYZ color system, which is a color space signal that is not L*a*b* and is not dependent on a device.

The profile creation unit 301 creates an output ICC profile in accordance with a relationship between the CMYK color signals and the input L*a*b* data of the test form. The profile creation unit 301 replaces the created output ICC profile with an output ICC profile that is already stored in the output ICC profile storage 305, thereby updating the output ICC profile.

The ISO 12642 test form includes patch images of CMYK color signals that cover a color reproduction region which can be output by a general copying machine. The profile creation unit 301 creates a color conversion table in accordance with a relationship between respective color signal values and the L*a*b* data having been subjected to the color management. That is, a conversion table from CMYK to Lab (A2Bx tag) is created. Based on the conversion table, a reverse conversion table (B2Ax tag) is created.

Figure 4:
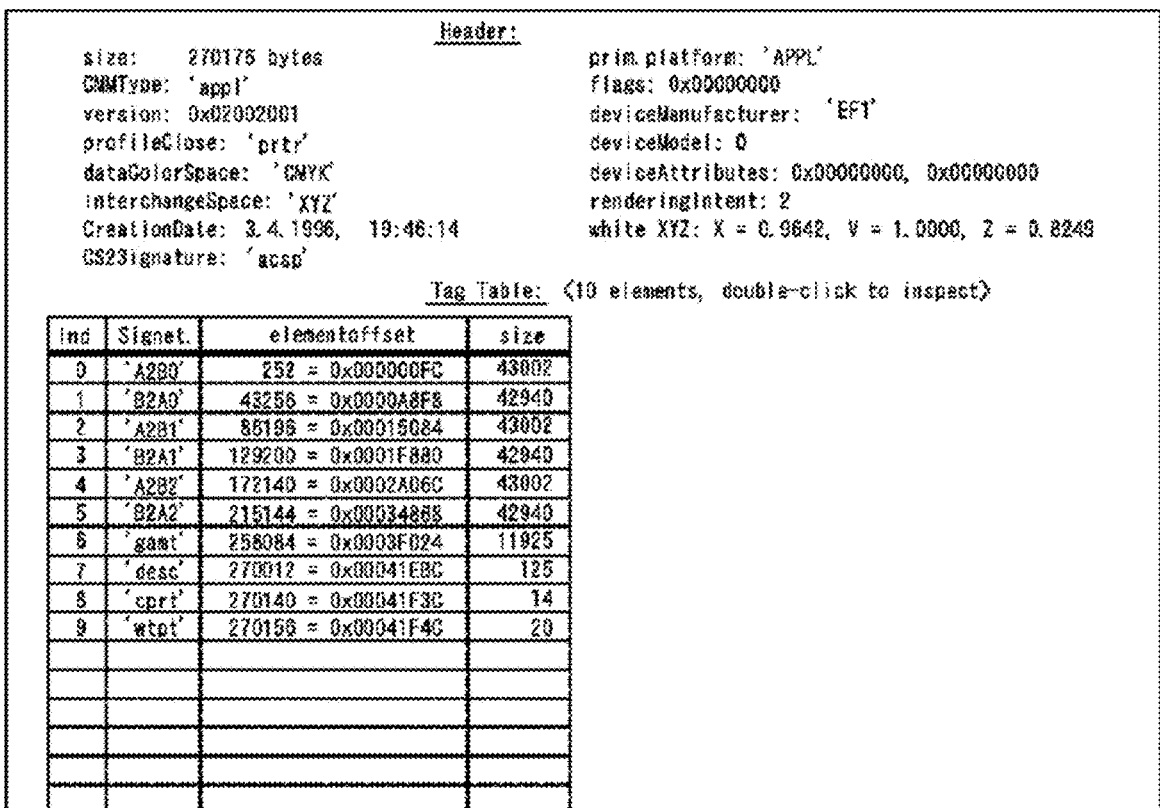
FIG. 4 is an explanatory view of an ICC profile.

FIG. 4 is an explanatory view of the ICC profile. The ICC profile includes a header, a tag, and data. In the tag, in addition to a color conversion table, there is also described, for example, a tag that describes whether a color expressed by white points (Wtpt) or L*a*b values defined inside the profile falls within or beyond a reproduction range that enables reproduction of a hard copy (gamt).

The printer controller 103 may also receive an instruction for profile creation from the host computer 300 via the external I/F 308. In this case, the printer controller 103 acquires the output ICC profile created by the host computer 300 and performs color conversion with an application compatible with the ICC profile.

In the color conversion in typical color image formation, image data that has been input envisioning RGB signal values input via the external I/F 308 or standard printing CMYK signal values such as those of Japan Color is stored in the input ICC profile storage 307 for external input. In this case, for example, a scanner as the host computer 300 is connected to the external I/F 308. The image data stored in the input ICC profile storage 307 is subjected to RGB→L*a*b* conversion or CMYK→L*a*b* conversion. The input ICC profile is formed of a one-dimensional LUT that controls a gamma value of an input signal, a multi-dimensional color LUT that is called direct mapping, and a one-dimensional LUT that controls a gamma value of generated conversion data. With use of those tables, the image data stored in the input ICC profile storage 307 is converted from a color space that is dependent on a device into L*a*b* data that is not dependent on a device.

Figure 5:
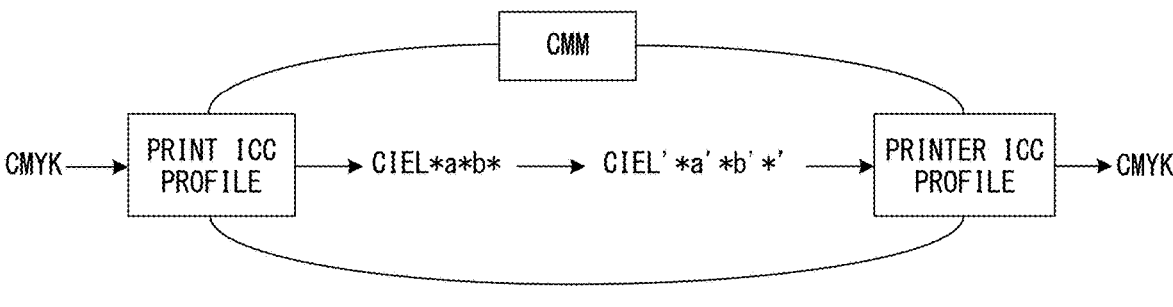
FIG. 5 is an explanatory view of color management.

The image data that has been converted into chromaticity coordinates of L*a*b* is input to the CMM 306. FIG. 5 is an explanatory view of color management by the CMM 306. The CMM 306 performs GUMAT conversion of mapping a mismatch between a color space read by, for example, a scanner that is the host computer 300 and an output color reproduction range of the image forming apparatus 100 as an output device. Further, the CMM 306 performs, for example, color conversion of adjusting a mismatch between a light source type given at the time of input and a light source type given in a case where an output item is observed (also referred to as a mismatch in color temperature setting) or black character determination.

Accordingly, the L*a*b* data is converted into L*'a*'b*' data and stored in the output ICC profile storage 305. As described above, the created profile is stored in the output ICC profile storage 305, and is subjected to color conversion with a newly created ICC profile, converted into CMYK signals that are dependent on an output device, and output. As illustrated in FIG. 5, the CMM 306 is a module that performs color management. The CMM 306 is a module that performs color conversion with use of an input profile and an output profile.

<Color Measurement Processing>

Figure 6:
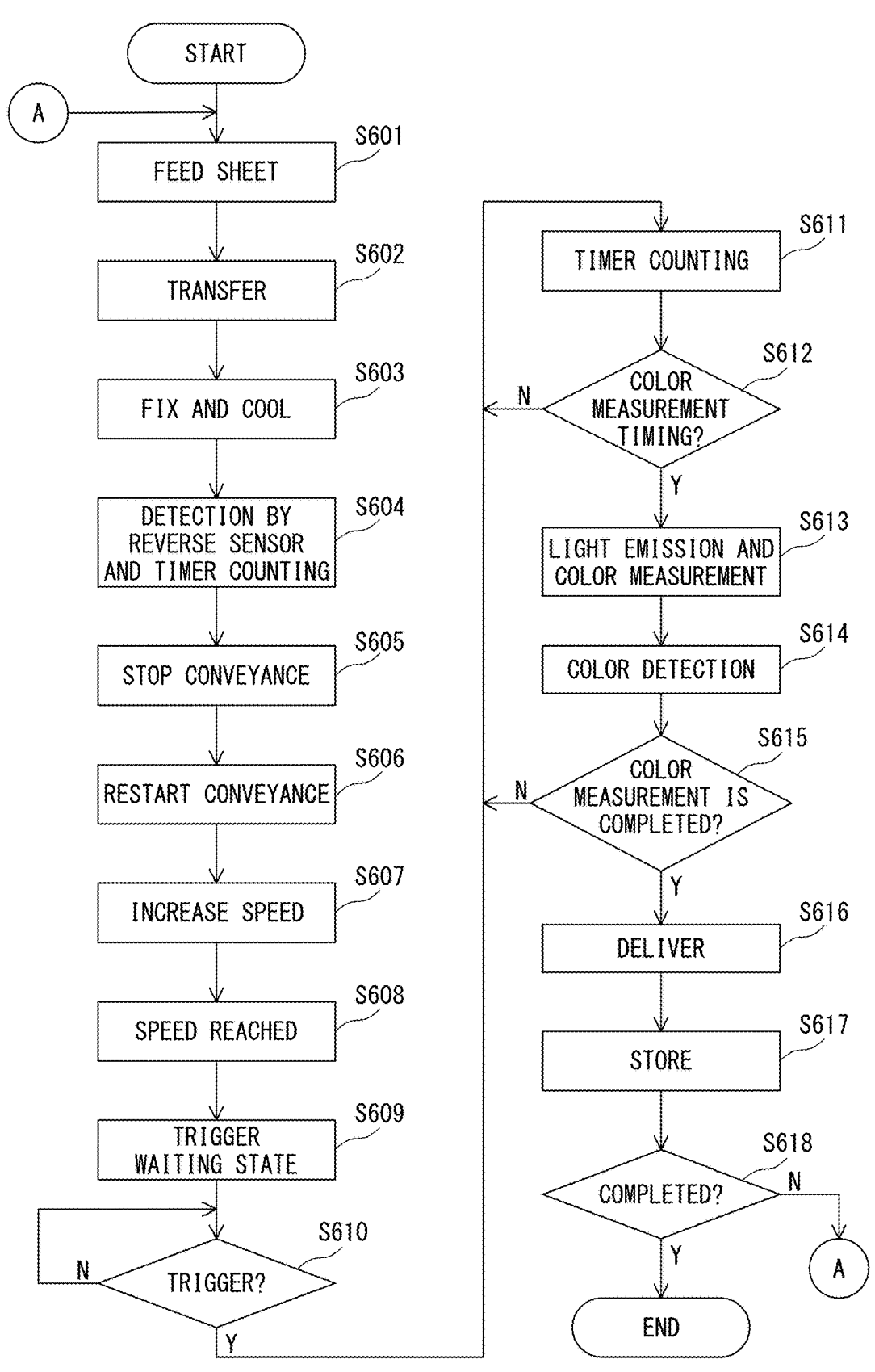
FIG. 6 is a flowchart for illustrating color measurement processing.

FIG. 6 is a flowchart for illustrating color measurement processing performed by using the color measurement unit 500. This processing is started, for example, in a case where a user operates the operation panel 180 to designate a color measurement print job including, for example, color profile creation for image adjustment, and a type of a sheet (for example, name, basis weight, and surface property) to be used for the color measurement print job.

The printer controller 103 controls the engine control unit 312 to start feeding of the sheet 110 from the sheet-feeding cassette 113 (Step S601). The printer controller 103 controls the engine control unit 312 to transfer a pattern image including a plurality of patch images for color profile creation onto the sheet 110 (Step S602). After that, the printer controller 103 controls the engine control unit 312 to fix the pattern image to the sheet 110 and cool the sheet 110 by using the fixing device 150 and the cooling unit 160 (Step S603). In the manner described above, the chart sheet having the patch images for color profile creation printed thereon is produced.

The printer controller 103 controls the engine control unit 312 to convey the chart sheet to the conveyance path 133 and, at the timing at which the reverse sensor 137 detects a leading edge of the chart sheet in the conveyance direction, performs timer counting by the amount corresponding to the length of the chart sheet in the conveyance direction (Step S604). The printer controller 103 controls the engine control unit 312 to convey the chart sheet by the amount corresponding to the length of the chart sheet in the conveyance direction or more to the reverse path 138 and temporarily stop the conveyance (Step S605). Accordingly, the entirety of the chart sheet is conveyed to the reverse path 138.

The printer controller 103 controls the engine control unit 312 to reverse the conveyance direction and restart the conveyance of the chart sheet that has stopped on the reverse path 138 (Step S606). Accordingly, the chart sheet is conveyed by the conveyance roller 131 to the post-conveyance path 135. The printer controller 103 controls the engine control unit 312 to increase the conveyance speed for the chart sheet (Step S607).

In a case where the conveyance speed for the chart sheet has reached the conveyance speed for color measurement (Step S608), the printer controller 103 brings the color sensor 200 into a trigger waiting state at the timing at which the leading edge of the chart sheet in the conveyance direction has arrived at the color measurement position of the color measurement unit 500 (Step S609). Reading of a trigger patch image, which is printed on the chart sheet, by the color measurement unit 500 serves as a trigger. The trigger patch image is described later.

The printer controller 103 monitors reading of the trigger patch image by the color measurement unit 500 (Step S610: N). In a case where the color measurement unit 500 reads the trigger patch image (Step S610: Y), the printer controller 103 starts the timer counting with the reading timing for the trigger patch image as a reference (Step S611). The printer controller 103 continues the timer counting until the color measurement timing (Step S612: N). The color measurement timing is a timing at which a count value reaches a value corresponding to a predetermined time. The predetermined time is a time from reading of the trigger patch image to the arrival of the patch image at the color measurement position of the color sensor 200.

In a case where the count value reaches the color measurement timing (Step S612: Y), the printer controller 103 causes the white LED 201 to emit light to perform color measurement for one patch image (Step S613). The printer controller 103 detects color of the patch image based on the color measurement result (Step S614). The printer controller 103 repeatedly performs the processing of Step S611 to Step S614 until the color measurement for all the patch images printed on one chart sheet is completed (Step S615: N). While the color measurement unit 500 reads the chart sheet, a part of the chart sheet is conveyed along the post-conveyance path 135 having a curve.

In a case where the color measurement for all the patch images printed on one chart sheet has been completed (Step S615: Y), the printer controller 103 controls the engine control unit 312 to deliver the chart sheet to the delivery tray 700 (Step S616). The printer controller 103 acquires the color measurement result as spectral reflectance data and performs the processing described above to generate various tables and color profiles, and then stores the tables and color profiles (Step S617). The printer controller 103 repeatedly performs the processing of Step S601 to Step S617 with respect to a predetermined number of chart sheets (Step S618: N). In a case where the color measurement with respect to the predetermined number of chart sheets has been completed (Step S618: Y), the printer controller 103 terminates the color measurement processing.

Figure 7:
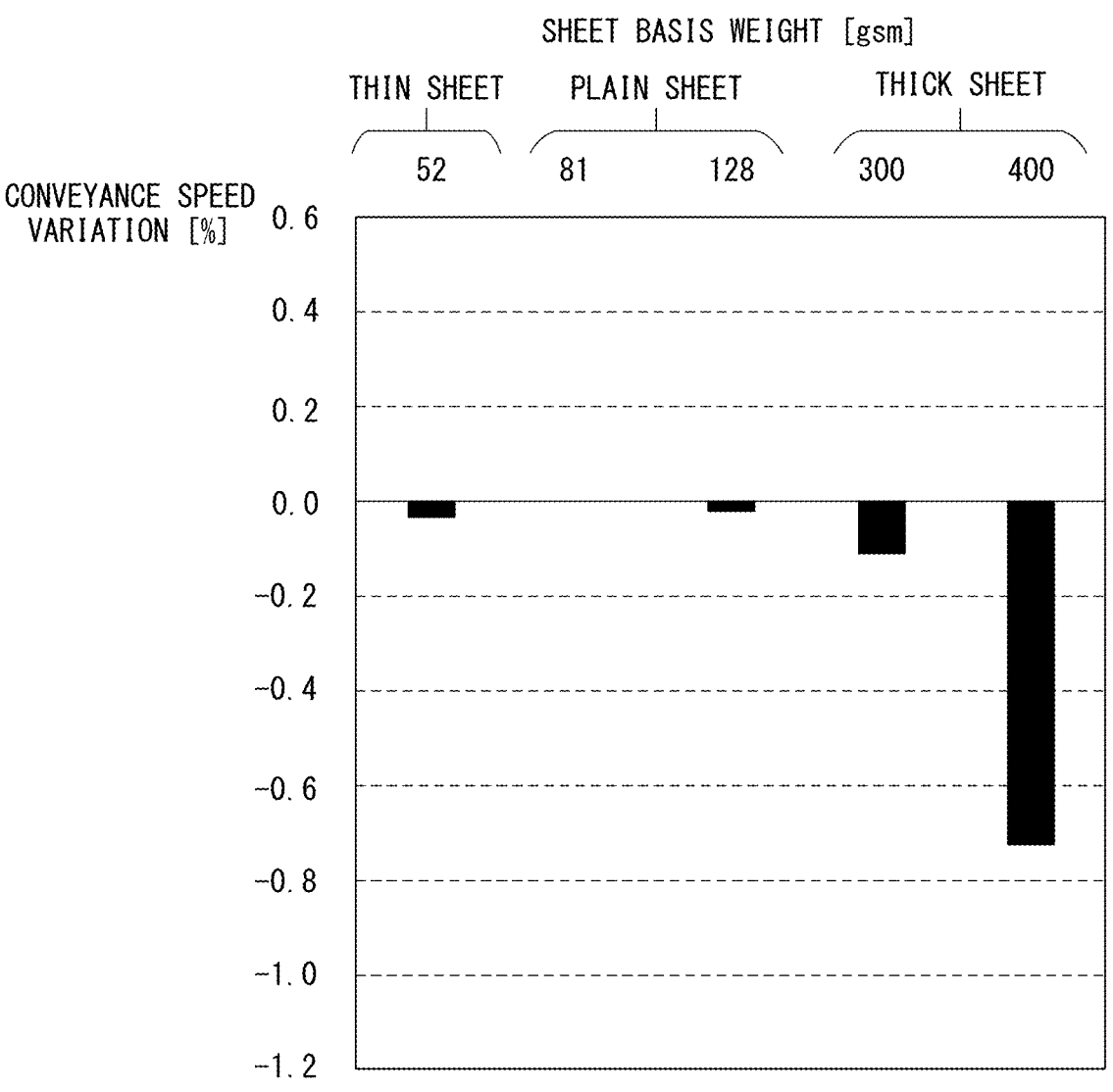
FIG. 7 is an explanatory graph for showing variations in conveyance speed for respective types of sheets.

FIG. 7 is an explanatory graph for showing variations in conveyance speed for respective types of the sheet 110. Here, with a conveyance speed for a plain sheet having a basis weight of 81 gsm as a reference, variations in conveyance speed for a thin sheet (basis weight of 52 gsm), a plain sheet (basis weight of 128 gsm), and thick sheets (basis weights of 300 gsm and 400 gsm) are exemplified. As is apparent from FIG. 7, the variations in conveyance speed for the thick sheets tend to be greater. Such variations in conveyance speed affect the color measurement processing (reading processing) for individual patch images by the color measurement unit 500.

Figure 8:
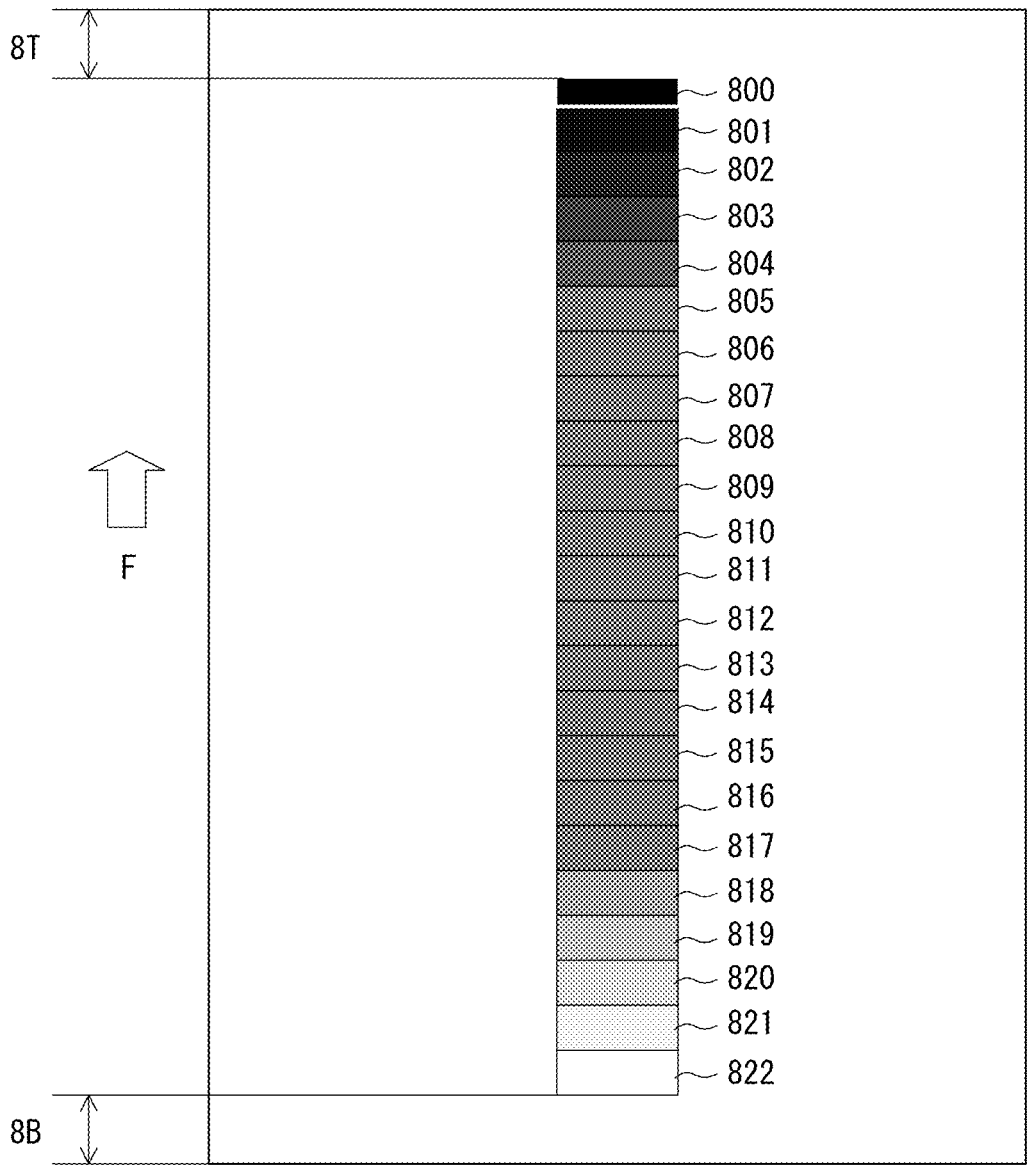
FIG. 8 is an illustrative view of a first pattern image.
Figure 9:
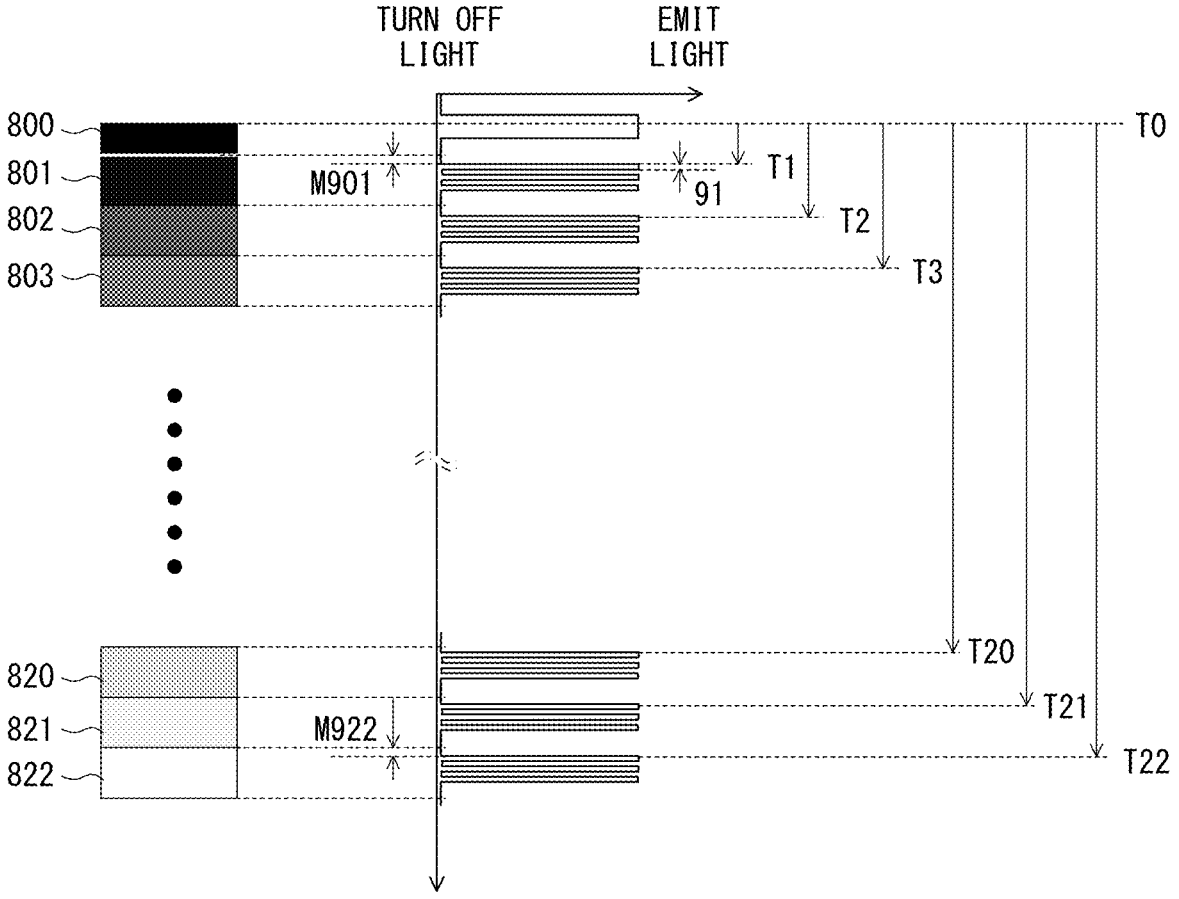
FIG. 9 is an explanatory view of color measurement processing on the first pattern image.
Figure 10:
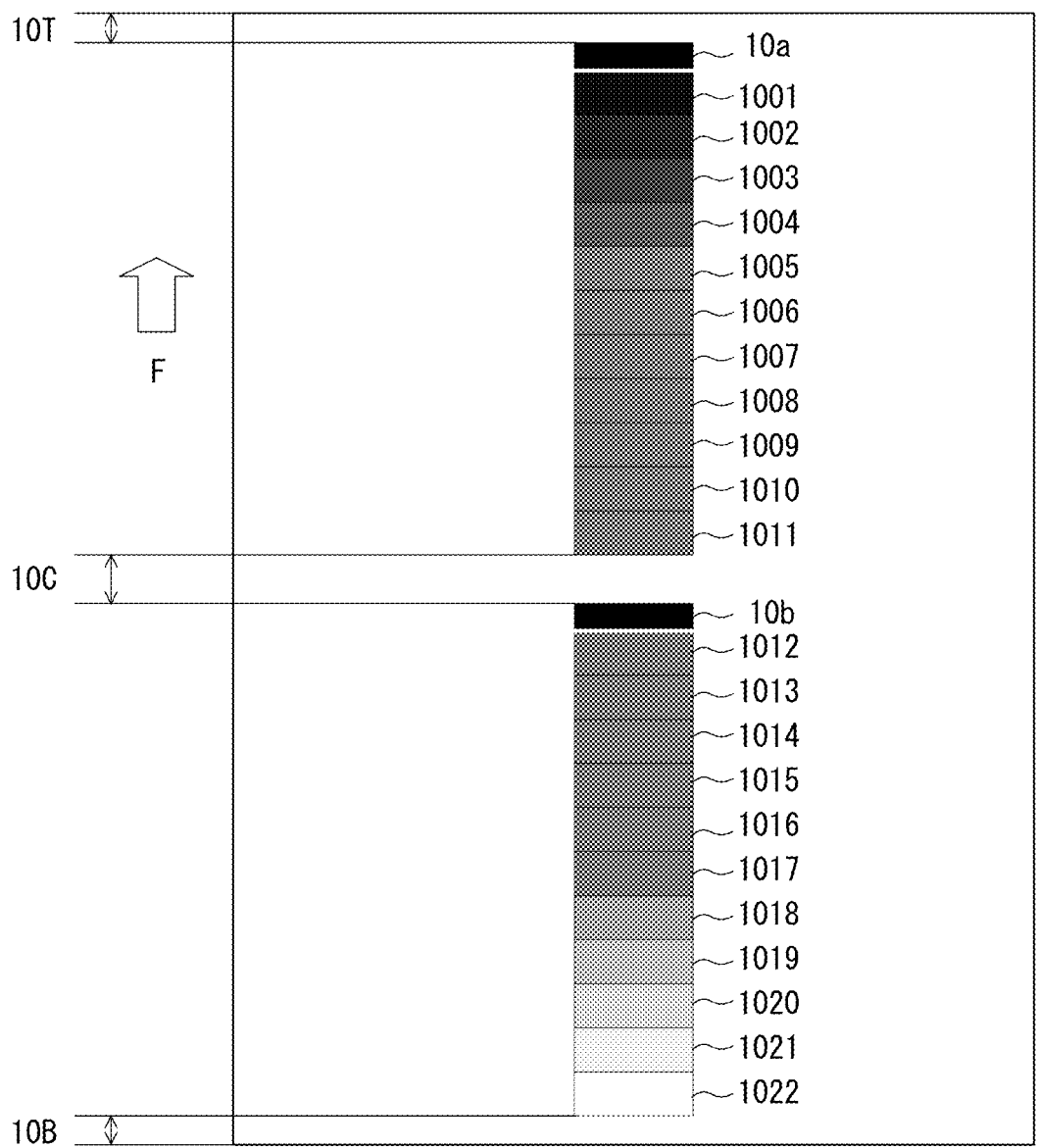
FIG. 10 is an illustrative view of a second pattern image.
Figure 11:
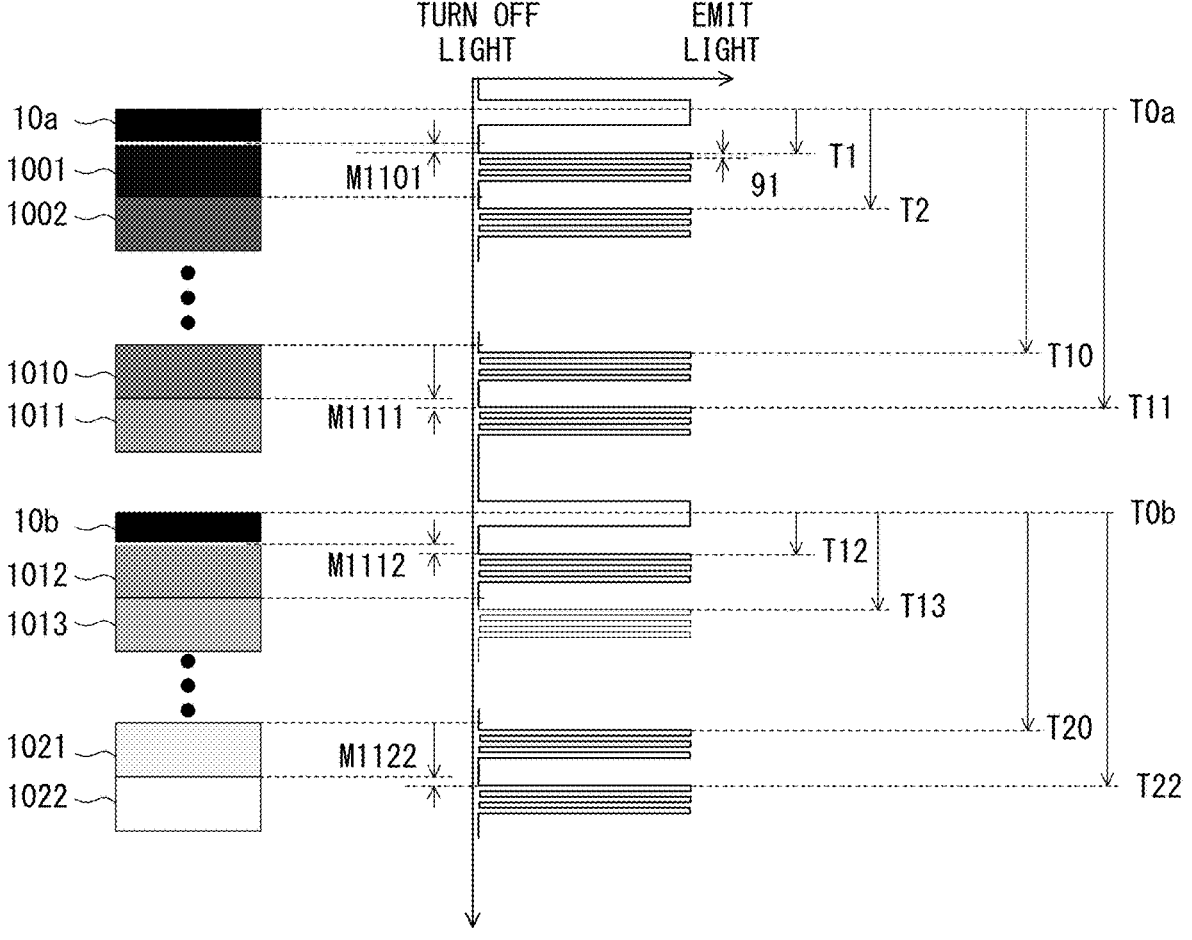
FIG. 11 is an explanatory view of color measurement processing on the second pattern image.

FIG. 8 is an illustrative view of a plurality of patch images (first pattern image) to be used for the color measurement. FIG. 9 is an explanatory view of color measurement processing on the first pattern image of FIG. 8. FIG. 10 is an illustrative view of a plurality of patch images (second pattern image) to be used for the color measurement. FIG. 11 is an explanatory view of the color measurement processing on the second pattern image of FIG. 10. In the following description, for example, the first pattern image is printed on the sheet 110 (first sheet) having a basis weight of 180 gsm (first basis weight), and the second pattern image is printed on the sheet 110 (second sheet) having a basis weight of 360 gsm (second basis weight).

In a case where a type of the sheet 110 to be used for a chart sheet is a plain sheet (here, the basis weight is less than 300 gsm), a chart sheet having the first pattern image illustrated in FIG. 8 printed thereon is produced. In the at least one embodiment, an example in which the first pattern image is printed on the sheet 110 of the A3 size is described, but a similar effect can be obtained also in a case in which the sheet 110 having another size is used.

A plain sheet is, in general, a sheet having a basis weight of from 50 gsm to 128 gsm, and is used as a standard sheet for representing a color tone of an image printed by the image forming apparatus 100 because of its large quantity in distribution. However, the plain sheet has a low stiffness, and hence "unevenness in focal depth due to meandering and corrugation of a sheet surface" is liable to occur, which may have the greatest influence in securing the reading stability with the color sensor 200 at the time of color measurement.

Thus, on a leading edge side and a trailing edge side of the chart sheet in the conveyance direction, there are provided a margin portion 8T and a margin portion 8B, respectively, which allow color measurement for a trigger patch image 800 and patch images 801 to 822 after a sheet posture is stabilized. The color measurement is performed while the chart sheet is conveyed in a conveyance direction F. Thus, in the at least one embodiment, the trigger patch image 800 is provided at a position apart from the sheet leading edge by a distance of the margin portion 8T. The plurality of subsequent patch images 801 to 822 (22 patches in total) are subjected to the color measurement for each chart sheet. The patch images 801 to 822 have different image densities. The patch images 801 to 822 include, for example, yellow patch images, magenta patch images, cyan patch images, and black patch images. In the at least one embodiment, the image densities of the patch images 801 to 822 are set higher on the leading edge side. The patch image 822 provided at the rearmost end is provided at a position apart from the sheet trailing edge by a distance of the margin portion 8B. A blank portion is provided between the trigger patch image 800 and the patch image 801 so that the color measurement unit 500 can recognize the trigger patch image 800.

FIG. 9 shows light emission timings of the white LED 201 at the time of reading the first pattern image. The white LED 201 is controlled so as to emit light at timings T1 to T22 with a detection timing TO for the trigger patch image 800 as a reference.

In a chronological order of the color measurement processing, the color sensor 200 is initially in a trigger waiting state (Step S609 of FIG. 6). The color sensor 200 starts counting using a timer 310 with the detection timing TO of reading the trigger patch image 800 as a reference, and causes the white LED 201 to emit light in order to perform the color measurement for the patch image 801 at the timing T1.

The timing T1 is set with a sheet conveyance delay margin M901 from a leading edge of the patch image 801. After the timing T1, the color sensor 200 repeats the light emission with an exposure time 91 a plurality of times and successively receives the reflected light from the patch image 801 to acquire a spectral reflectance waveform. After the color measurement for the patch image 801 by the plurality of light emitting operations, the color sensor 200 repeats similar operations at the timings T2 to T22 to successively perform the color measurement for the patch images 802 to 822 to acquire spectral reflectance waveforms. Accordingly, the color measurement for one chart sheet is completed.

As shown in FIG. 7, the variation in conveyance speed in the case of using a plain sheet for the chart sheet is less than 0.2%. Thus, even in a case where there is any deviation in conveyance distance due to the variation in conveyance speed, a delay margin M922 at the timing T22 is maintained. The delay margin M922 is maintained, and hence erroneous detection of the patch image is prevented. Accordingly, the color measurement unit 500 can perform color measurement for the 22 patch images 801 to 822 one after another sequentially.

However, in a case where a type of the chart sheet is a thick sheet, the variation in conveyance speed may be about 0.7%, which is significant. Thus, the delay margin M922 may become smaller. As a result, at the color measurement timing T22 for the patch image 822, the patch image 821 may be still present at the color measurement position by the color sensor 200, which may result in erroneous detection of the patch image. In view of such disadvantage, in a case where a thick sheet is used as a type of the chart sheet, the second pattern image of FIG. 10 is printed on the sheet 110 in order to prevent erroneous detection of the patch image.

The thick sheet has a high stiffness, and hence the "unevenness in focal depth due to meandering and corrugation of a sheet surface" is less liable to occur. Thus, a margin portion 10T and a margin portion 10B which are provided on the leading edge side and the trailing edge side, respectively, in the conveyance direction of the chart sheet can be set shorter than the margin portion 8T and the margin portion 8B of a plain sheet. In the second pattern image, in a space obtained by such a configuration, in addition to a trigger patch image 10a (first trigger image), a trigger patch image 10b (second trigger image) can be provided between a patch image 1011 and a patch image 1012. A margin portion 10C is provided between the patch image 1011 and the trigger patch image 10b.

The trigger patch image 10b is provided to reset the delay caused by the variation in conveyance speed, which becomes larger in a case where a thick sheet is used. A blank portion is provided between the trigger patch image 10a and the patch image 1001 and between the trigger patch image 10b and the patch image 1012 so that the color measurement unit 500 can recognize the trigger patch images 10a and 10b.

The trigger patch images 10a and 10b are also read while the chart sheet is conveyed. Thus, the trigger patch images 10a and 10b have the same size as that of the trigger patch image 800 of FIG. 8. Further, the size of each of a plurality of patch images 1001 to 1011 arranged subsequent to the trigger patch image 10a and the size of each of a plurality of patch images 1012 to 1022 arranged subsequent to the trigger patch image 10b are the same as the size of each of the patch images 801 to 822 of FIG. 8. Thus, under color measurement conditions (exposure time 91 and the number of times of color measurement) similar to those in the case of a plain sheet, the color measurement for the chart sheet of a thick sheet can be performed with the same accuracy as that in the case of a plain sheet. The patch images 1001 to 1022 have different image densities. In the at least one embodiment, the image densities of the patch images 1001 to 1022 are set higher on the leading edge side.

FIG. 11 shows light emission timings of the white LED 201 at the time of reading the second pattern image. The white LED 201 is controlled so as to emit light at timings T1 to T11 with a detection timing T0a for the trigger patch image 10a as a reference and emit light at timings T12 to T22 with a detection timing T0b for the trigger patch image 10b as a reference.

In a chronological order of the color measurement processing, the color sensor 200 is initially in a trigger waiting state (Step S609 of FIG. 6). The color sensor 200 starts counting using the timer 310 with the detection timing T0a of reading the trigger patch image 10a as a reference, and performs the color measurement for the patch images 1001 to 1011. As shown in FIG. 7, the variation in conveyance speed in the case of using a thick sheet for the chart sheet is about 0.7%, which is significant. However, the number of patch images to be subjected to color measurement with reading of the trigger patch image 10a as a reference is reduced by half as compared to a plain sheet. Thus, a delay margin M1111 of the timing T11 is maintained.

After the color measurement for the patch image 1011, the color sensor 200 is brought into the trigger waiting state again, and waits for reading of the trigger patch image 10b. The color sensor 200 starts counting using the timer 310 with the detection timing T0a of reading the trigger patch image 10b as a reference, and performs color measurement for the patch images 1012 to 1022. The number of patch images subjected to the color measurement with reading of the trigger patch image 10b as a reference is reduced by half as compared to a plain sheet, and hence a delay margin M1122 of the timing T22 is maintained.

As described above, the delay margins M1111 and M1122 are maintained also in the case of a thick sheet. Thus, erroneous detection of the patch image is prevented. The color measurement unit 500 first performs color measurement for 11 patch images 1101 to 1111 sequentially one after another at the timings with the detection timing T0a as a reference. After that, the color measurement unit 500 can perform color measurement for 11 patch images 1112 to 1122 sequentially one after another at the timings with the detection timing T0b as a reference.

Here, the trigger patch image 10b is provided such that the number of the patch images 1001 to 1011 subsequent to the trigger patch image 10a and the number of the patch images 1012 to 1022 subsequent to the trigger patch image 10b are the same. The number of patch images subsequent to the trigger patch image is only required to be the number that enables preventing erroneous detection of a patch image caused by the variation in conveyance speed. Thus, it is not always required that the trigger patch image 10b be arranged at the center of the patch images 1001 to 1022. That is, the number of patch images subsequent to the trigger patch image 10a and the number of patch images subsequent to the trigger patch image 10b are not limited to the same number.

A type of the sheet to be used for the chart sheet is instructed through the operation panel 180. As described above, for example, at the time of instructing the color measurement processing of FIG. 6, a user uses the operation panel 180 to designate the color measurement print job and a type of a sheet (for example, name, basis weight, and surface property). Before the pattern image is printed on a sheet in the processing of Step S602 and Step S603, the printer controller 103 determines which one of the first pattern image and the second pattern image is to be printed in accordance with a type of a sheet that has been designated. Specifically, the first pattern image is printed on a sheet having a basis weight smaller than a predetermined value, and the second pattern image is printed on a sheet having a basis weight larger than the predetermined value. Values of the first basis weight and the second basis weight are illustrative, and are not limited to the values of the basis weight described in the at least one embodiment. The first basis weight is a basis weight smaller than the predetermined value, and the second basis weight is a basis weight larger than the predetermined value. Further, the predetermined value of the basis weight is also not limited to 300 gsm. A type of the pattern image to be printed is determined based on the basis weight in the description above, but may be determined in accordance with a name of the sheet. In any case, the second pattern image is printed on a sheet having a large variation in conveyance speed.

Further, the image forming apparatus 100 may include a detection device for detecting a type of a sheet. The detection device detects, for example, a basis weight of a sheet and determines a type of the sheet based on the basis weight that has been detected. The printer controller 103 detects a type of a sheet based on a determination result of a type of a sheet and determines a pattern image to be printed.

The types of the pattern images may be more than two types described above. Types of pattern images may be prepared for types of sheets that can be subjected to printing by the image forming apparatus 100. However, the number of patch images to be printed on one sheet is required to be the same number for any type.

As described above, the image forming apparatus 100 according to the at least one embodiment prepares a plurality of arrangement patterns of the patch images used for inline color measurement in accordance with types of sheets to be used. Accordingly, the inline color measurement can be performed while maintaining the color measurement performance with high accuracy even in a case of a thick sheet like the one called a cardboard sheet. Thus, the range of compatibility for the inline color measurement is expanded, thereby being capable of achieving power saving in various color measurement needs such as assurance of a product with attachment of a color measurement result report.

Figure 12:
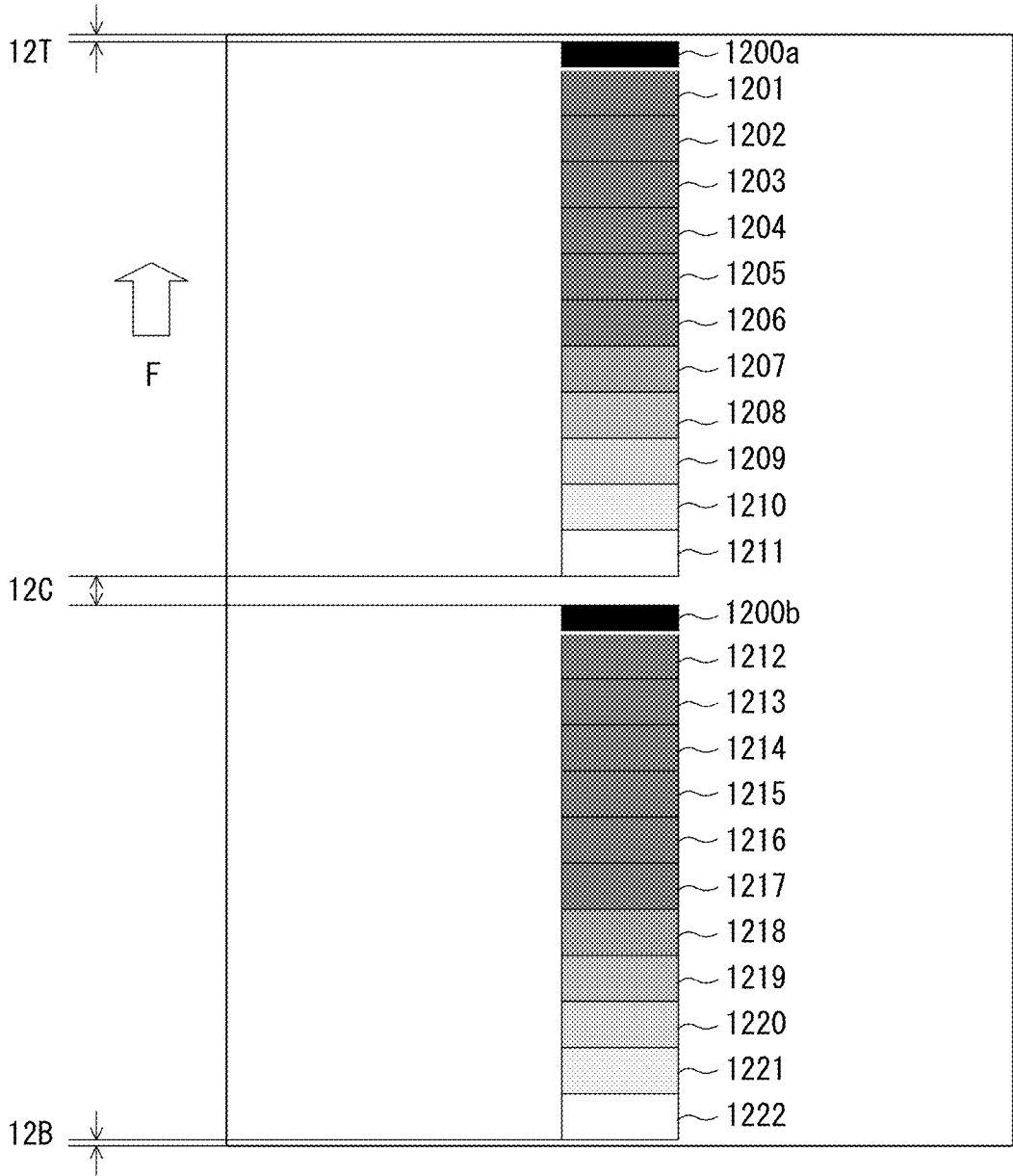
FIG. 12 is a modification illustrative view of the second pattern image.

FIG. 12 is a modification illustrative view of the second pattern image. In the pattern image of FIG. 12, the size of each of a plurality of patch images 1201 to 1222 in the conveyance direction is set so as to be larger than the size of each of the patch images 1001 to 1022 of FIG. 10 in the conveyance direction. A trigger patch image 1200a is arranged more on a leading edge side of a sheet than the trigger patch image 10a of FIG. 10. That is, a margin portion 12T and a margin portion 12B are set so as to be shorter than the margin portion 10T and the margin portion 10B of FIG. 10. A blank portion is provided between the trigger patch image 1200a and the patch image 1201 and between the trigger patch image 1200b and the patch image 1212 so that the color measurement unit 500 can recognize the trigger patch images 1200a and 1200b.

In a case where the size of each of the patch images 1201 to 1222 given in the case of using a thick sheet for the chart sheet is set larger than that given in the case of using a plain sheet as described above, a sufficient margin with respect to the variation in conveyance speed can be provided. The patch images 1201 to 1222 have different image densities. In the at least one embodiment, the image densities of the patch images 1201 to 1222 are set so as to be higher on the leading edge side.

In the case of the image adjustment with a type of a sheet having a significant variation in conveyance speed as described above, the number of patch images to be read as triggered by one time of detection of a trigger (reading of the trigger patch image) is set smaller than that in the case of image adjustment with a type of a sheet that has a small variation in conveyance speed. For example, the number of patch images to be read as triggered by one time of detection of a trigger in the case of performing the image adjustment with a thick sheet is set smaller than the number of patch images to be read as triggered by one time of detection of a trigger in the case of performing the image adjustment with a plain sheet. In the examples of FIG. 10 and FIG. 12, the number of patch images to be read as triggered by one time of detection of a trigger in the case of performing the image adjustment with a thick sheet is half the number of patch images to be read as triggered by one time of detection of a trigger in the case of performing the image adjustment with a plain sheet.

In a case where the image adjustment is performed with the chart sheet having such a trigger patch image and patch images printed thereon, even in a case in which the variation in conveyance speed for the sheet is larger than a predetermined value, the risk of causing erroneous detection due to reading of a patch image that is adjacent in the conveyance direction can be reduced. Thus, even in a case where a thick sheet is used for the chart sheet, the stability of the color measurement can be improved. That is, stable color measurement can be performed even in a case in which a type of a sheet is different.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application-no. 2023-038351, filed Mar. 13, 2023, which is hereby incorporated by reference herein in its entirety.

What is claimed is:

1. An image forming apparatus comprising:
an image forming unit configured to form an image on a sheet based on an image forming condition;
a conveyance unit configured to convey a sheet having a pattern image formed thereon by the image forming unit to a conveyance path, the pattern image including a plurality of patch images and a trigger image used for controlling a reading timing for each of the plurality of patch images;
a reading unit configured to read the pattern image on the sheet while the sheet having the pattern image formed thereon is conveyed by the conveyance unit; and
a controller configured to:
in a case of forming the pattern image on a first sheet having a first basis weight, control the image forming unit to form a first pattern image on the first sheet, and generate the image forming condition based on a result of reading the first pattern image by the reading unit;
in a case of forming the pattern image on a second sheet having the same size as a size of the first sheet and having a second basis weight larger than the first basis weight, control the image forming unit to form a second pattern image on the second sheet, and generate the image forming condition based on a result of reading the second pattern image by the reading unit;
the number of trigger images included in the second pattern image being larger than the number of trigger images included in the first pattern image, a position of one trigger image on the second sheet being different from a position of another trigger image on the second sheet in a conveyance direction in which the sheet is conveyed.

2. The image forming apparatus according to claim 1, wherein the second pattern image includes a first trigger image and a second trigger image, and
wherein a length from a leading edge of the second sheet to the first trigger image of the second pattern image in the conveyance direction is shorter than a length from a leading edge of the first sheet to the trigger image of the first pattern image in the conveyance direction.

3. The image forming apparatus according to claim 1, wherein the second pattern image includes a first trigger image and a second trigger image, and wherein a position of the first trigger image overlaps a position of the second trigger image in a direction orthogonal to the conveyance direction.

4. The image forming apparatus according to claim 3, wherein a first patch image included in the plurality of patch images is located between the first trigger image and the second trigger image on the second sheet in the conveyance direction, and wherein a second patch image included in the plurality of patch images is located closer to a trailing edge of the second sheet than the second trigger image in the conveyance direction.

5. The image forming apparatus according to claim 4, wherein the second pattern image on the second sheet has a blank region located closer to a trailing edge than the first patch image in the conveyance direction and closer to a leading edge than the second trigger image in the conveyance direction.

6. The image forming apparatus according to claim 1, wherein the number of the plurality of patch images of the first pattern image is equal to the number of the plurality of patch images of the second pattern image.

7. The image forming apparatus according to claim 1, wherein the image forming condition is a color profile.

8. The image forming apparatus according to claim 1, wherein the image forming unit is configured to receive image data, convert the image data based on a conversion condition as the image forming condition, and form the image on the sheet based on the converted image data.

9. The image forming apparatus according to claim 1, further comprising a reverse path to be used for reversing the conveyance direction, wherein the reading unit is configured to convey the sheet having the pattern image formed thereon from the reverse path by using the conveyance unit.

10. The image forming apparatus according to claim 1, wherein the first basis weight is smaller than a predetermined value, and wherein the second basis weight is larger than the predetermined value.

11. The image forming apparatus according to claim 1, wherein the reading unit is configured to receive reflected light from the pattern image and output spectral data based on a reception result of the reflected light.

12. The image forming apparatus according to claim 1, wherein the image forming unit includes a tray for delivering the sheet having the image formed thereon, and wherein the reading unit is configured to read the pattern image on the sheet conveyed by the conveyance unit in order to deliver the sheet to the tray.

13. The image forming apparatus according to claim 1, wherein the plurality of patch images have different colors.

14. The image forming apparatus according to claim 1, wherein a part of the sheet is conveyed along a conveyance path having a curve during a period in which the reading unit reads the sheet.

15. The image forming apparatus according to claim 1, wherein the size of each of the plurality of patch images of the second pattern image in the conveyance direction is larger than the size of each of the plurality of patch images of the first pattern image in the conveyance direction.

\* \* \* \* \*